United States Patent [19]

Schwarz

[11] Patent Number: 5,789,739
[45] Date of Patent: Aug. 4, 1998

[54] OPTICAL DETECTION DEVICE FOR DETERMINING THE POSITION OF AN INDICATOR MEDIUM

[75] Inventor: Franz Schwarz, Glottertal, Germany

[73] Assignee: Sick AG, Waldkirch/Breisgau, Germany

[21] Appl. No.: 735,632

[22] Filed: Oct. 23, 1996

[30] Foreign Application Priority Data

Oct. 26, 1995 [DE] Germany ............... 195 39 955.2

[51] Int. Cl.$^6$ .................................................. G01V 9/04
[52] U.S. Cl. ................... 250/221; 250/559.38; 356/375
[58] Field of Search ............................. 250/221, 234, 250/559.38, 559.4, 222.1, 222.2, 206.2, 206.1; 356/141.2, 152.1, 375; 340/555–557

[56] References Cited

U.S. PATENT DOCUMENTS

| | | | |
|---|---|---|---|
| 4,762,990 | 8/1988 | Caswell | 250/221 |
| 4,820,050 | 4/1989 | Griffin | 250/221 |
| 5,148,016 | 9/1992 | Murakami et al. | 250/221 |

FOREIGN PATENT DOCUMENTS

| | | |
|---|---|---|
| 0 577 308 A2 | 1/1994 | European Pat. Off. |
| 2 236 746 | 2/1974 | Germany. |
| 1 805 097 | 12/1974 | Germany. |
| 24 22 139 | 1/1975 | Germany. |
| WO 90/13095 | 11/1990 | WIPO. |
| WO 94/11758 | 5/1994 | WIPO. |

*Primary Examiner*—Que Le
*Attorney, Agent, or Firm*—Townsend and Townsend and Crew LLP

[57] ABSTRACT

The invention relates to an optical detection device for determining the position of an indicator medium on or in front of a projection surface with an optical monitoring field arranged directly in front of or slightly spaced from the presentation surface parallel to the latter, wherein either at least one scanner is provided which transmits light beams in the plane of the monitoring field, which scans the monitoring field and delivers angle and distance measurements related to the respective position of the indicator medium in the monitoring field, or wherein, starting from two different positions, range and/or angle measurement devices are provided which transmit light beams in the plane of the monitoring field, and wherein the angular range scanned by each of the two range and/or angle distance measuring devices respectively embraces the whole monitoring field, and wherein the respective position of the indicator medium in the monitoring field can be computed from the range and angular values delivered by the range and/or angle measurement devices.

42 Claims, 3 Drawing Sheets

OPTICAL DETECTION DEVICE FOR DETERMINING THE POSITION OF AN INDICATOR MEDIUM

FIELD OF THE INVENTION

The invention relates to an optical detection device for determining the position of an indicator medium on or in front of a presentation surface, with an optical monitoring field arranged directly in front of or slightly spaced from the presentation surface, parallel to the presentation surface.

DESCRIPTION OF PRIOR ART

Such detection devices are for example used as an input medium for the sequence control of interactive computer programs of all kinds. A detection device of this kind is customarily termed a "touch-screen".

In addition to the named optical detection devices use is also made of detection devices with resistive technology. In these detection devices a voltage measurement device is provided which, as a rule, registers the touching of a plastic-on-glass membrane.

A disadvantage of detection devices with resistive technology is the fact that the said membrane wears in the course of time through the repetitively occurring contacts, which can ultimately lead to a functional breakdown.

In contrast the initially named optical detection devices have the advantage that they operate free of contact and thus have a higher resistance to breakdown.

Known detection devices of the named kind which operate on the optical principle can for example consist of two light grids arranged crosswise which build up the monitoring field in front of a presentation surface or in front of a viewing screen. If a pointer or indicator medium, for example the finger of a user, is moved to a specific position of the viewing screen then corresponding light paths of the two light grids arranged crosswise are interrupted. These interrupted light paths or their position within the light grids then provide information concerning the position of the pointer medium in the monitoring field or on the screen.

Disadvantageous with the known detection devices is the high economic cost associated therewith with respect to the technical realization and also the likewise present susceptibility to breakdown and/or interference.

OBJECT OF THE INVENTION

It is an object of the invention to form an optical detection device of the initially named kind in such a way that it can be realized at low economic cost and complexity and in particular ensures a high reliability against breakdown and/or interference.

BRIEF DESCRIPTION OF THE INVENTION

In accordance with a first solution variant of the invention this object is satisfied in that at least one scanner is provided which transmits light beams in the plane of the monitoring field, which scans the monitoring field and delivers angular and distance measurements related to the respective position of the indicator medium in the monitoring field.

In accordance with a further solution variant of the invention the said object is satisfied in that, starting from two different positions, range and/or angle measurement devices are provided which transmit light beams in the plane of the monitoring field, and in that the angular range scanned by each of the two range and/or angle measuring devices in each case embraces the full monitoring field, with the respective position of the indicator medium in the monitoring field being calculable from the range and/or angle values delivered by the range and/or angle measurement devices.

In accordance with the first solution variant the light grids which are known from the prior art are for example replaced by a single scanner which scans the monitored field and delivers information concerning the position of the indicator medium in the monitored field.

In this respect the scanner can for example embrace a monitored sector of a circle in which the monitored field is contained by means of a laser beam deflected via an oscillating mirror or a mirror wheel. The position of the indicator medium in the monitored field can then be detected by determining the distance of the pointer medium from the scanner and also the angular position within the monitored circular sector.

An advantage of the invention is to be seen in the fact that a single commercially available scanner can be used in place of the previously used light grid system of complicated design which in certain applications brings about a substantially lower economical cost.

This advantage is in particular of benefit when large monitored fields are required since a plurality of transmitter-receiver units were required for the monitoring of such monitored fields using the previously customary light grids, whereas now only a single scanner is necessary.

A further advantage of the invention can be seen in the fact that a higher spatial resolution can be achieved in certain applications in comparison to the previously used light grids.

Moreover, the use of a scanner has the advantage that optical elements such as transmitters, receivers and/or reflectors do not have to be arranged around the monitoring field as was necessary with the previously customary light grids, but rather it is sufficient to provide one scanner at only one point, preferably at the margin of the monitored field. It is not necessary to provide any further optical devices in addition to the scanner. Suitable scanners are, for example, described in U.S. Pat. No. 5,455,669 assigned to the company Erwin Sick GmbH Optik Elektronik of Waldkirch, Germany. The content of this U.S. Pat. No. 5,455,669 is hereby incorporated into this application by reference. Since it is not necessary to provide any further optical devices in addition to the scanner, apparatus provided with an optical detection device in accordance with the invention can be manufactured, at least for applications with large monitored fields, at comparatively reduced economic cost and with smaller dimensions than was previously possible.

Through the provision of a scanner at only one position, preferably at the margin of the monitored field, a high reliability against breakdown and/or interference can be achieved in comparison with the prior art since an optically sensitive critical outlet surface is only present at the said position, whereas, in accordance with the prior art, a critical surface of this kind extends around the monitored field with substantially larger dimensions in total. Through the reduction of this critical area in accordance with the invention the danger of eventual contamination is substantially reduced, which leads to an increase in the reliability against dirt and noise.

The evaluation of the signals delivered by the scanner can be managed in an economical way and means with simple and customary programs without difficulties.

Finally, the detection device in accordance with the invention can be retro-fitted in simple manner since no special constructional changes need be effected at the presentation surface or at the viewing screen itself.

In a preferred embodiment of the invention the angular range embraced by the scanner lies approximately between 90° and 180°. In certain applications other angular ranges are however also conceivable.

The scanner is preferably arranged in a corner region of a substantially rectangular monitoring field. In this case the angular range embraced by the scanner can amount to about 90°.

However, it is also possible, in the context of the invention, to give the monitoring field any other desired shape and to so form the angular range embraced by the scanner that the desired monitoring field is contained in this angular range.

Normally just one scanner is provided which embraces the whole monitoring field. With particularly large monitoring fields or with scanners which are not very powerful it is however also possible to provide a plurality of scanners of which each embraces only a partial region of the desired monitoring field.

In accordance with the second solution variant of the invention two range and/or angle measurement devices are used in place of the scanner and, starting from two different positions, transmit light beams in the plane of the monitoring field.

When using range measurement devices the position of the indicator medium in the monitored field can then be determined without problem from the respectively found distances of the pointer medium from the range measuring devices. This is likewise possible when using angle measuring devices since a unique calculation of the position can also be carried out on the basis of two angular values related to the respective position of the indicator medium in the monitoring field.

The advantages already described can also be achieved with this solution variant.

A difference which is to be taken into account between the said range measurement devices and the said angle measurement devices lies in the fact that the range measuring device transmits a static light beam which is broadened to a specific angular range, whereas the angle measurement devices are as a rule formed as rotary beam scanners which transmit a moved light beam which scans a corresponding angular range. These rotary beam scanners however thereby only determine angular values and not distance values. The range measuring devices are consequently static systems, whereas the angle measuring devices represent dynamic systems.

In a preferred embodiment of the second solution variant both range measurement devices and/or angle measurement devices are respectively arranged in the edge region of a monitored field, and the arrangement must take place in such a way that a position determination is possible. This signifies that the range and/or angle measurement devices should for example not be arranged in oppositely disposed marginal regions.

The angular range which is respectively embraced by the two range and/or angle measurement devices can lie approximately between 90° and 180° and other angular ranges are also conceivable here depending on the precise application.

With a substantially rectangular monitored field it is of advantage when the two range and/or angle measurement devices are arranged at adjacent corner regions or at neighboring corner points of the monitoring field. In this case the angular range respectively embraced by the two range and/or angle measurement devices can amount to approximately 90°.

With both solution variants of the invention the scanner or the range and/or angle measurement devices can be accommodated in a housing region, whereby the said elements are protected against mechanical damage and against contamination. The single opening of the said housing region can thereby be formed by a light outlet gap through which the required monitoring takes place.

It is of advantage when the scanner or the range and/or angle measurement devices are arranged, with a vertically extending monitoring field, in the upper marginal region of the monitoring field or above this marginal region, since then the danger of contamination by settling dust for example is reduced.

In both solution variants in accordance with the invention the distance between the presentation surface and the monitored field preferably amounts to between 2 mm and 20 mm, in particular to approximately 5 mm.

The minimum spacing between the presentation surface and the monitored field should be selected to be so large that a layer of dirt or contamination deposited on the monitored surface cannot lead to a permanent signal. The corresponding maximum distance should be dimensioned so that in any case an adequate, unambiguous, positional determination is possible, that is to say that an unambiguous association is possible between the position at which the pointer medium penetrates the monitored area and the position of a symbol represented on the presentation surface. In this respect account should be taken of the fact that the pointer medium will not always extend perpendicular to the presentation surface or to the monitored area but can also have an inclined position.

The named distances can also be correspondingly larger with smaller system resolution or with pointer media of larger dimensions. With a low system resolution attention should furthermore be paid to ensuring that the pointer media used have adequately large dimensions so that a recognition is guaranteed.

The presentation surface and monitored field can be so formed that their sizes correspond approximately to one another or are identical. As a rule identical sizes are sensible because a detection of the position of the pointer medium is desirable in the entire region of the presentation surface.

The invention can particularly preferably be used when the presentation surface is formed as a monitor, in particular a monitor of the size between 10 and 20 inches. In this connection the invention is for example useful for operating interactive computer programs of diverse kinds (graphic programs, automatic cash machines, operator controls of automatic copying machines, etc.). Interactive television also represents a possible application for the present invention.

It is, however, also possible to use the invention in connection with presentation surfaces formed as shop window panes, and such shop window panes can readily have diagonal dimensions of up to 10 m. When using corresponding scanners, range measurement devices or angle measurement devices even larger dimensions are also conceivable in this respect. Here it should however be taken into account that with such large presentation surfaces the danger exists that a plurality of indicator media can be present simultaneously. If necessary, technical programming precautions should be made in this respect.

In the last named application the invention can for example be used to select specific elements portrayed in a shop window and via these to display more detailed information.

Furthermore, it is possible to design the presentation surface as a projection surface, in particular as a projection surface for a flip chart apparatus. By way of example images displayed on computer monitors can be projected onto a screen in front of which a detection device in accordance with the invention is arranged. In this case the program which generates the projected image can then for example be operated interactively by means of a pointer moved in front of or on the screen.

In a special application the presentation surface can also be formed as a transparent pane arranged above or alongside a conveyor belt, for example with waste which is to be sorted being transported on the conveyor belt. A person can then respectively point to that region of the pane beneath which elements are being transported so that the elements can then be selected with a grasper device provided further on in the conveying direction. The apparatus of the invention thereby embraces the process of interpretation and indicates the position of the element to be selected to the grasper which can then effect the selection in a directed manner. In this application it is of advantage that the aforementioned person does not come into contact with the waste to be selected.

The above named applications are only given as an example. The invention can, however, be meaningfully used in a plurality of other applications (information/service stands, gaming programs, operation of medical and industrial apparatus).

BRIEF LISTING OF THE FIGURES

DESCRIPTION OF PREFERRED EMBODIMENTS

Figure 1:
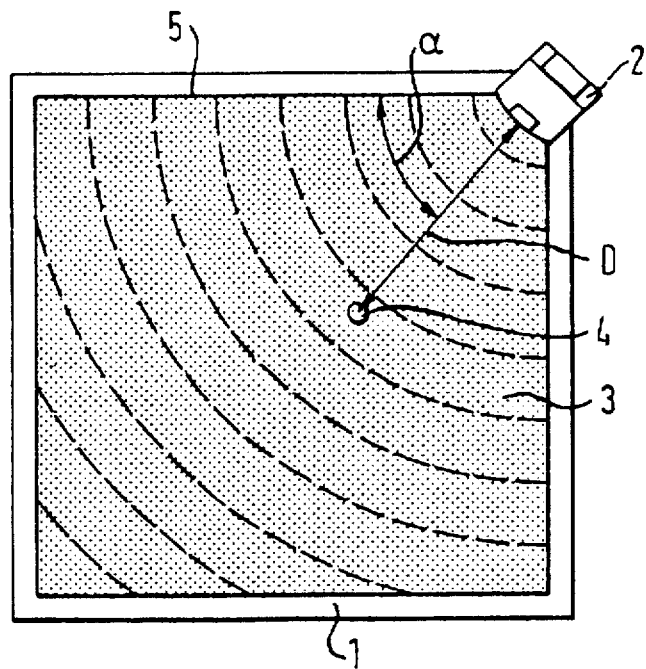
FIG. 1 is a schematic plan view of a device in accordance with the invention in accordance with a first solution variant.

FIG. 1 shows a substantially square presentation surface 1. A scanner 2 is arranged in the region of the top right-hand corner of this presentation surface 1 and builds up a monitoring field 3 which is illustrated in gray. The monitoring field 3 is thereby formed by light beams transmitted by the scanner which extend in the plane of the monitored field 3.

If an indication is made on the presentation surface 1 by means of a pointer medium 4 then this pointer medium is necessarily located in the monitoring field 3. The scanner 2 can then determine the distance D between the scanner and the pointer medium 4 and also the angle α with reference to an outer reference line 5 of the scanner. The distance D and the angle α thereby deliver precise information concerning the instantaneous position of the pointer medium 4 within the monitoring field 3 or on the presentation surface 1.

Figure 2:
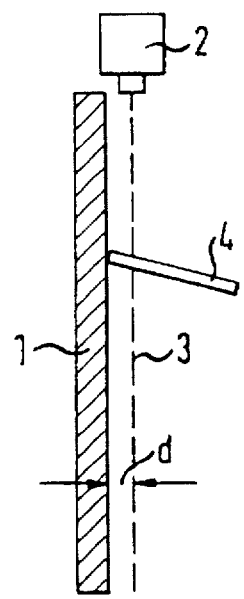
FIG. 2 is a side view of the apparatus shown in FIG. 1.

FIG. 2 shows the apparatus of FIG. 1 from a side perspective. It can be seen that the monitoring field 3 is arranged at a distance d from the presentation surface 1.

The pointer medium 4 which points to the presentation surface 1 penetrates the monitoring field 3 and can thus be detected by the scanner 2.

Figure 3:
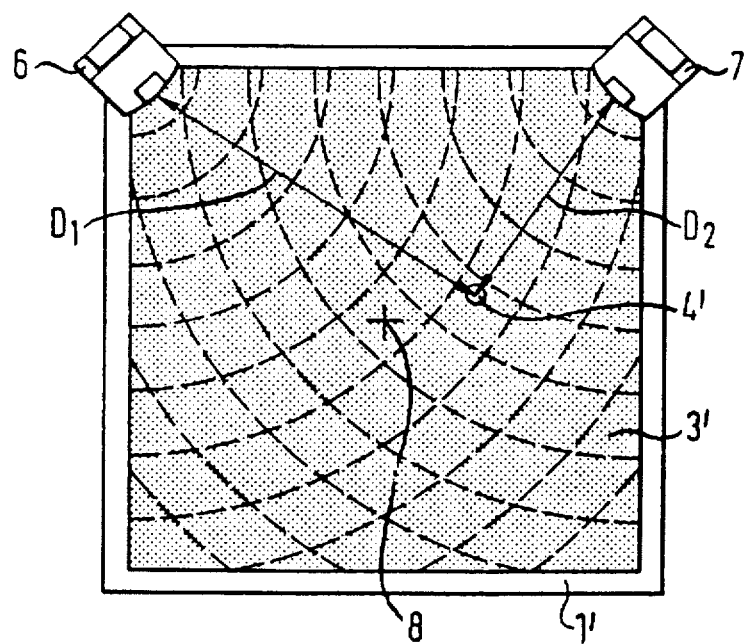
FIG. 3 is a schematic plan view of a device in accordance with a second solution variant of the invention when using range measurement devices.

FIG. 3 corresponds essentially to FIG. 1 with the distinction that two range measurement devices 6, 7 are present instead of the scanner 2.

The range measuring devices 6, 7 are thereby located at two neighboring corner points of the square monitoring field 3'.

The light beams which measure the range are in each case broadened out to 90° so that each of the two range measurement devices 6, 7 embraces the full monitored field 3'. The two regions embraced by the range measurement devices 6, 7 are identical which is achieved in that the two range measurement devices 6, 7 are respectively aligned with the middle point 8 of the monitored field.

Each of the two range measurement devices 6, 7 thereby determines the distance $D_1$ or $D_2$ between the pointer medium 4' which penetrates the monitored field 3' and the respective range measurement device 6 or 7.

Since the distance of the range measurement devices 6, 7 from one another is known, the precise position of the pointer medium 4' in the monitoring field 3', i.e. at the presentation surface 1', can be unambiguously calculated from the two distances $D_1$ and $D_2$.

What is claimed is:

1. Optical detection device for determining the position of an indicator medium directed on or in front of a presentation surface which has an optical monitoring field arranged in front of and parallel to the presentation surface and defining a plane, the optical detection device comprising at least one scanner for transmitting light beams in the plane of the optical monitoring field to scan the entire monitoring field and to locate the indicator medium by a distance defined along a line between the at least one scanner and the indicator medium and by an angle defined between the line and a reference line of the at least one scanner.

2. Optical detection device in accordance with claim 1, wherein the optical monitoring field is slightly spaced from the presentation surface.

3. Optical detection device in accordance with claim 1, wherein the optical monitoring field is disposed directly on the presentation surface.

4. Optical detection device in accordance with claim 1, wherein the at least one scanner is positioned in a marginal region of the monitoring field.

5. Optical detection device in accordance with claim 4, wherein the monitoring field is substantially rectangular and the at least one scanner is positioned in a corner region of the monitoring field.

6. Optical detection device in accordance with claim 5, wherein the scanner scans an angular range of approximately 90°.

7. Optical detection device in accordance with claim 1, wherein the scanner scans an angular range which lies approximately between 90° and 180°.

8. Optical detection device in accordance with claim 1, wherein the optical detection device comprises one scanner for scanning the entire monitoring field.

9. Optical detection device in accordance with claim 1, wherein the at least one scanner is protectively accommodated in a housing region which has a light outlet gap.

10. Optical detection device in accordance with claim 1, wherein the monitoring field is substantially vertically extending and the at least one scanner is disposed in an upper marginal region of the monitoring field.

11. Optical detection device in accordance with claim 1, wherein the monitoring field is substantially vertically extending and the at least one scanner is disposed above an upper marginal region of the monitoring field.

12. Optical detection device in accordance with claim 1, wherein the monitoring field is spaced from the presentation surface by a distance of about 2–20 mm.

13. Optical detection device in accordance with claim 12, wherein the monitoring field is spaced from the presentation surface by a distance of about 5 mm.

14. Optical detection device in accordance with claim 1, wherein the monitoring field and presentation surface are approximately equal in size.

15. Optical detection device in accordance with claim 1, wherein the presentation surface comprises a monitor having a size between about 10 to 20 inches.

16. Optical detection device in accordance with claim 1, wherein the presentation surface comprises a shop window pane.

17. Optical detection device in accordance with claim 16, wherein the shop window pane is substantially rectangular with diagonal dimensions of up to about 10 m.

18. Optical detection device in accordance with claim 1, wherein the presentation surface comprises a projection surface.

19. Optical detection device in accordance with claim 18, wherein the projection surface is a flip-chart projection surface.

20. Optical detection device in accordance with claim 1, wherein the projection surface comprises a transparent pane disposed about a conveyor belt transporting articles.

21. Optical detection device in accordance with claim 20, wherein the transparent pane is disposed above the conveyor belt.

22. Optical detection device for determining the position of an indicator medium directed on or in front of a presentation surface which has an optical monitoring field arranged in front of and parallel to the presentation surface and defining a plane, the optical detection device comprising two measurement devices spaced from one another for transmitting light beams in the plane of the optical monitoring field to each scan the entire monitoring field and to measure positional parameters to locate the indicator medium with respect to the two measurement devices, wherein at least one of the positional parameters is a distance defined along a line between one of the two measurement devices and the indicator medium.

23. Optical detection device in accordance with claim 22, wherein the positional parameters comprise a first distance defined along a first line between a first one of the two measurement devices and the indicator medium and a second distance defined along a second line between a second one of the two measurement devices and the indicator medium.

24. Optical detection device in accordance with claim 22, wherein the positional parameters further comprise an angle defined between a line extending from one of the two measurement devices and the indicator medium and a reference line of the one measurement device.

25. Optical detection device in accordance with claim 22, wherein the two measurement devices are disposed in spaced edge regions of the monitoring field.

26. Optical detection device in accordance with claim 22, wherein the two measurement devices each scan an angular range of approximately 90°.

27. Optical detection device in accordance with claim 22, wherein the two measurement devices each scan an angular range which lies approximately between 90° and 180°.

28. Optical detection device in accordance with claim 22, wherein the monitoring field is substantially rectangular and the two measurement devices are positioned in neighboring corner regions of the monitoring field.

29. Optical detection device in accordance with claim 22, wherein the two measurement devices each comprise a rotating beam scanner.

30. Optical detection device in accordance with claim 22, wherein the two measurement devices are protectively accommodated in a housing region which has a light outlet gap.

31. Optical detection device in accordance with claim 22, wherein the monitoring field is substantially vertically extending and the two measurement devices are disposed in an upper marginal region of the monitoring field.

32. Optical detection device in accordance with claim 22, wherein the monitoring field is substantially vertically extending and the two measurement devices are disposed above an upper marginal region of the monitoring field.

33. Optical detection device in accordance with claim 22, wherein the monitoring field is spaced from the presentation surface by a distance of about 2–20 mm.

34. Optical detection device in accordance with claim 33, wherein the monitoring field is spaced from the presentation surface by a distance of about 5 mm.

35. Optical detection device in accordance with claim 22, wherein the monitoring field and presentation surface are approximately equal in size.

36. Optical detection device in accordance with claim 22, wherein the presentation surface comprises a monitor having a size between about 10 to 20 inches.

37. Optical detection device in accordance with claim 22, wherein the presentation surface comprises a shop window pane.

38. Optical detection device in accordance with claim 37, wherein the shop window pane is substantially rectangular with diagonal dimensions of up to about 10 m.

39. Optical detection device in accordance with claim 22, wherein the presentation surface comprises a projection surface.

40. Optical detection device in accordance with claim 39, wherein the projection surface is a flip-chart projection surface.

41. Optical detection device in accordance with claim 22, wherein the projection surface comprises a transparent pane disposed about a conveyor belt transporting articles.

42. Optical detection device in accordance with claim 41, wherein the transparent pane is disposed above the conveyor belt.

* * * * *